(12) United States Patent
Dillon et al.

(10) Patent No.: US 8,731,144 B2
(45) Date of Patent: May 20, 2014

(54) TEMPORARY CALLBACK SYSTEM FOR EMERGENCY CALLS AND METHODS THEREOF

(75) Inventors: Patrick Dillon, Ottawa (CA); Ken Wu, Nepean (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 0 days.

(21) Appl. No.: 13/373,661

(22) Filed: Nov. 25, 2011

(65) Prior Publication Data

US 2013/0136241 A1    May 30, 2013

(51) Int. Cl.
*H04M 11/00*    (2006.01)

(52) U.S. Cl.
USPC .............................................. 379/45; 379/37

(58) Field of Classification Search
USPC .................................... 379/45, 37; 455/404.1
See application file for complete search history.

(56) References Cited

U.S. PATENT DOCUMENTS

| | | | |
|---|---|---|---|
| 5,864,755 A * | 1/1999 | King et al. | 379/37 |
| 7,127,044 B1 * | 10/2006 | Becker et al. | 379/45 |
| 2002/0111159 A1 | 8/2002 | Faccin et al. | |
| 2002/0136361 A1 | 9/2002 | Stumer et al. | |
| 2003/0086538 A1 * | 5/2003 | Geck et al. | 379/45 |
| 2008/0063153 A1 * | 3/2008 | Krivorot et al. | 379/45 |

FOREIGN PATENT DOCUMENTS

WO    WO 97/48247 A2    12/1997

\* cited by examiner

*Primary Examiner* — Stella Woo

(57) ABSTRACT

The present disclosure relates to emergency services and more particularly, to a temporary callback system for emergency calls and methods thereof. In one illustrative embodiment, the system can include a private branch exchange (PBX) or other processing device having a pool of callback identities. When an emergency call is made, a callback identity can be temporarily assigned to the device making the call. The callback identity can provide insurance that the call is maintained. If the call between the device and answering point becomes abandoned or disconnected, the callback identity can be used to re-establish the connection. The callback identity can be released when cleared by the answering point or when a time limit expires. After being released, the callback identity can be made available to other devices that wish to make emergency calls.

13 Claims, 4 Drawing Sheets

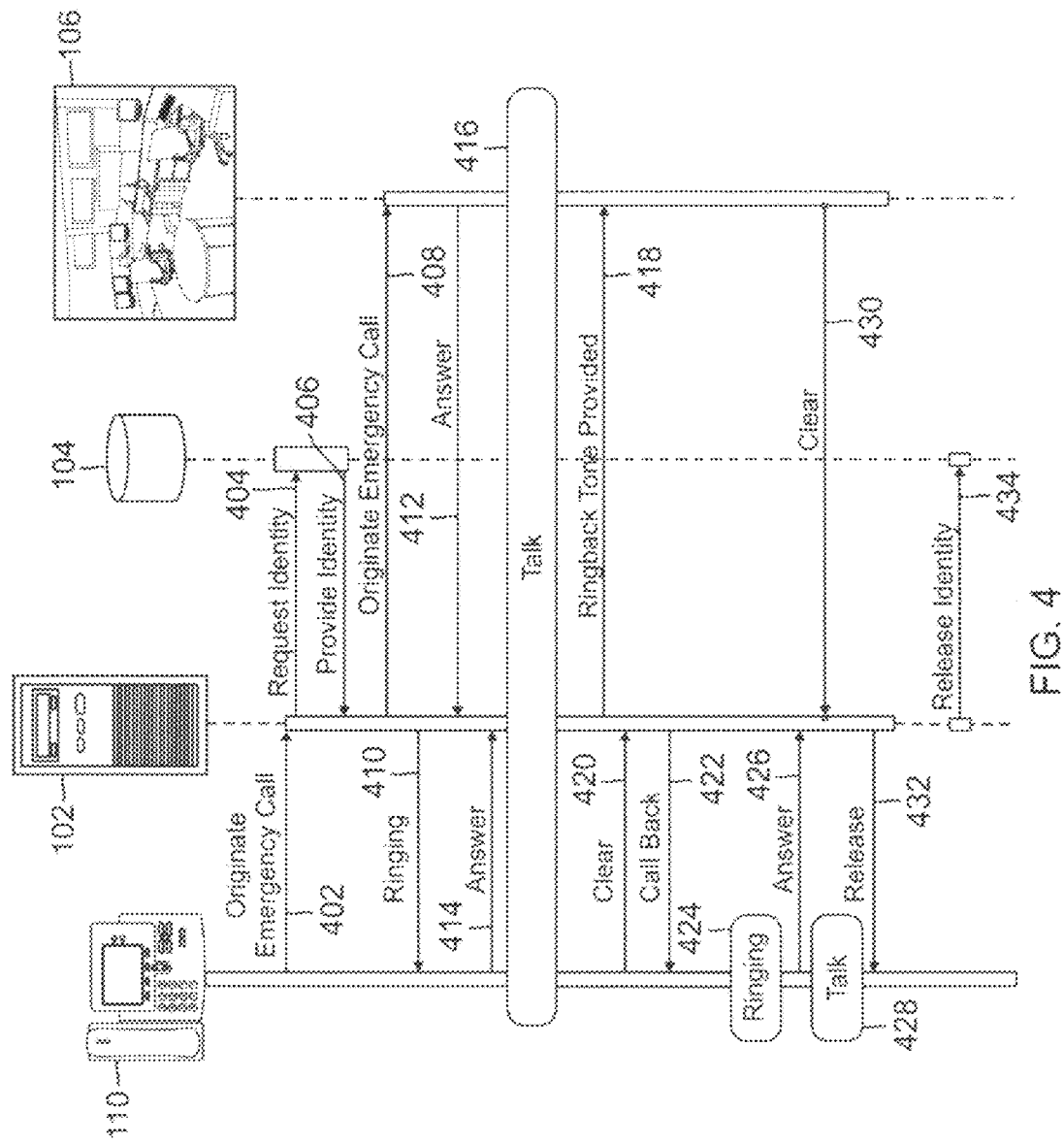

TEMPORARY CALLBACK SYSTEM FOR EMERGENCY CALLS AND METHODS THEREOF

TECHNICAL FIELD

This disclosure generally relates to communications, and more particularly, to providing emergency services through the provision of callback identities for a public safety answering point.

BACKGROUND

When dialing "911", an emergency can be reported. Ordinarily, such telephone calls can be routed to a local municipality dispatcher through a service identifier. A local dispatch center can identify those emergency response resources available near the location of the originator of the emergency call and route the appropriate resources to the scene. An emergency call can also be routed by a private branch exchange (PBX) to a public switched telephone network (PSTN). In some instances, there can be an on-site public safety answering point (PSAP). Emergency calls can be routed by the PBX to the PSAP for immediate action.

Emergency calls can be dropped. Provisioning devices can provide a callback identity for those devices connected into the PBX. This can require additional processing for emergency call handling. Often, however, there is a lack of emergency call provisioning for these devices. A need therefore exists for a temporary callback system for emergency calls and methods thereof that overcome those issues described above. These, as well as other related advantages, will be described in the present disclosure.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 4 is a diagram illustrating exemplary processes for handling an emergency call when the call becomes abandoned after being established in accordance with one or more aspects of the present disclosure.

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The present disclosure relates to emergency services and more particularly, to a temporary callback system for emergency calls and methods thereof. In one illustrative embodiment, the system can include a private branch exchange (PBX) or other processing device having a pool of callback identities. When an emergency call is made, a callback identity can be temporarily assigned to the device making the call. The callback identity can provide insurance that the call is maintained. If the call between the device and answering point becomes abandoned or disconnected, the callback identity can be used to re-establish the connection. The callback identity can be released when cleared by the answering point or when a time limit expires. After being released, the callback identity can be made available to other devices that wish to make emergency calls.

A number of advantages can be offered by the illustrative embodiment described above. Through the callback identities, devices having no assigned directory number can be used for emergency calls. Resources can be shared by limiting the time of use by a device. Furthermore, a system administrator can control distribution of the callback identities and release of them. Many additional advantages of the present disclosure will become apparent to those skilled in the relevant art as provided for in the following description.

Figure 1:
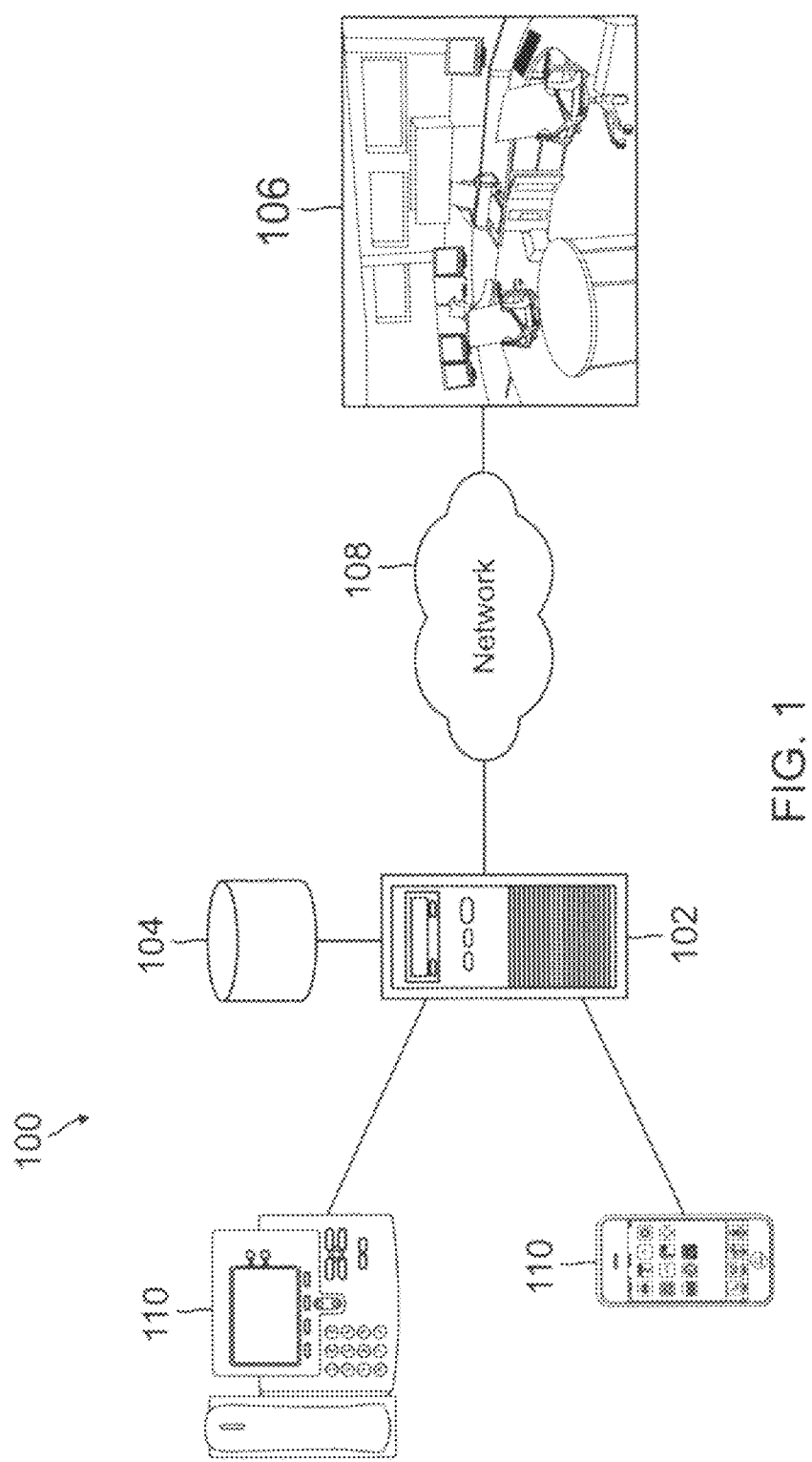
FIG. 1 is an illustrative temporary callback system for emergency calls in accordance with one or more aspects of the present disclosure.

Turning to FIG. 1, an illustrative temporary callback system 100 for emergency calls in accordance with one or more aspects of the present disclosure is shown. While numerous components will be described within the system 100, those skilled in the relevant art will appreciate that fewer or more components can be included or removed from the system 100. Generally described, the system 100 can provide a temporary callback identity to a device 110 when an emergency call is made. During this time, the callback identity can be assigned only to that device 110. Emergency callbacks can be redirected to that device 110 via the callback identity. At the expiration of a time limit or at the command of a system administrator, the callback identity can be made free for other emergency calls.

The system 100 can include a PBX 102, pool of callback identities 104, answering point 106 and user devices 110. Emergency calls can take place between the components wirelessly or through a wireline connection. A number of protocols can be used to receive and provide communications through the system 100. Session control protocols to control the set-up and tear-down of communications can be implemented. Codecs which encode communications allowing transmission over a network 108 as digital communications via a stream can also be provided. Codec use can be varied between different implementations of communications over the network 108. Some implementations rely on narrowband and compressed communications, while others support high fidelity codecs. Numerous types of protocols exist, which are known to those skilled in the relevant art.

Many types of networks can be integrated into the system 100. For example a wireless network can be provided between a user device 110 and the PBX 102. The network 108 shown within the system 100 can include, but is not limited to, a local area network (LAN), wide area network (WAN), personal area network (PAN), campus area network (CAN), metropolitan area network (MAN), global area network (GAN) or combination thereof. Such networking environments are commonplace in office networks, enterprise-wide computer networks, intranets and the Internet, which are all types of networks.

Continuing with FIG. 1, the PBX 102 can be coupled to the user devices 110, pool of callback identities 104 and the answering point 106 through the network 108. Those skilled in the relevant art will appreciate that other types of processing devices or hosts can be used. In one embodiment, the emergency calls and callback identities can be processed on the user devices 110 or the answering point 106 thereby removing the use of the PBX 102.

The PBX 102 can operate on a traditional telephone exchange. The exchange can include an operating system and software instructions, ROM, RAM, at least one processor, network interface and data storage. The exchange can process communications from user devices 110 or any other component within the system 100. The exchange can typically handle high volumes of transactions and large amount of queries for communication and data processing. RAM and ROM are used to support the program codes that are operated by the processor. The memory can be in a form of a hard disk, CD ROM, or equivalent storage medium. The processor can support authentications such as communications from external data servers, as well as allowing for anonymous transactions and general data encryption.

A pool of callback identities 104 can be associated with the PBX 102. These callback identities can be unassigned DNs. When assigned, the callback identities can be monitored and tracked by the PBX 102. The callback identities can be used to maintain an emergency call. The identities can be stored on a single database. Alternatively, the identities can be stored in a distributed system at numerous locations. Each of the identities can be associated with a time stamp or time limit. When expired, the identities can be released back into the pool of callback identities 104 and can be reassigned to other user devices 110. Generally, the callback identities are not associated with a location.

As shown in FIG. 1, the PBX 102 can communicate with an answering point 106 through the network 108. The answering point 106 can take the form of a call center responsible for answering calls to an emergency telephone number for police, firefighting, and ambulance services. The answering point 106 can provide appropriate responses based on the received calls. The answering point 106 can be a public safety answering point (PSAP), emergency response notification (ERN) system, emergency call alarm display or the like. The callback identities that are assigned to user devices 110 can be reported to the answering point 106.

Typically, when an identification service is not available, a callback identity from the pool 104 can be assigned so that the device 100 can be reached. The system 100 can temporarily assign a callback identity to a particular device 110 when it makes an emergency call. A time limit can be associated with the callback identity, for example, thirty minutes, an hour, twenty-four hours, forty-eight hours, etc. and can be dependent on the emergency. During this time, the callback identity can be assigned only to that device 110 and emergency callbacks to the PBX 102 can be redirected to that device 110 via the callback identity. At the end of the time limit, the callback identity can be made free for other emergency calls as will be shown in FIG. 2.

By assigning a callback identity to the device 110, emergency call handling can be completed by the answering point 106. If the user of the device 110 abandons the call while ringing the answering point 106, a callback can occur when an operator at the answering point 106 answers the call as will be shown in FIG. 3. If the caller abandons the call while in the talk state with the answering point 106, the call back can occur immediately as will be shown in FIG. 4. In the event that an emergency call occurs and the caller clears before the emergency call is completed, the original caller can be rung until such time that the answering point 106 clears the call. This ring back can occur for all emergency calls in a talk state. Generally, it is up to the answering point 106 to clear the emergency call. This can occur even through transit nodes.

When a Caller's Emergency Service Identification (CESID) is available, the CESID can be used as a priority. The CESID can be provided in Link Layer Discovery Protocol-Media Endpoint Devices (LLDP-MED), Layer 2-Cisco Discovery Protocol (L2-CDP) and manual CESID programming. Generally, assigning callback identities is due to the lack of system programmed emergency call identity data. When a device attempts an emergency call and has no other location or identification information, an available callback identity can be assigned to that device 110. This callback identity can be reported to the PSAP, ERN system or to an emergency call alarm display. These interfaces can then initiate a call to the callback identity, which can result in the device 110 being called. A callback identity can be reserved for that device 110 until the system administrator clears the association or a timeout occurs. The system administrator can have control over the length of time the identity is reserved for the device 110.

While a device 110 is associated with an emergency callback identity, re-registering the device 110 can cause the device 110 to obtain the same callback identity. This can occur until such time as the administrator removes the callback identity association or an administrator defined timeout occurs. In one embodiment, callback handling can be provided if the caller clears an emergency call before the answering point 106 fully clears the call.

Figure 2:
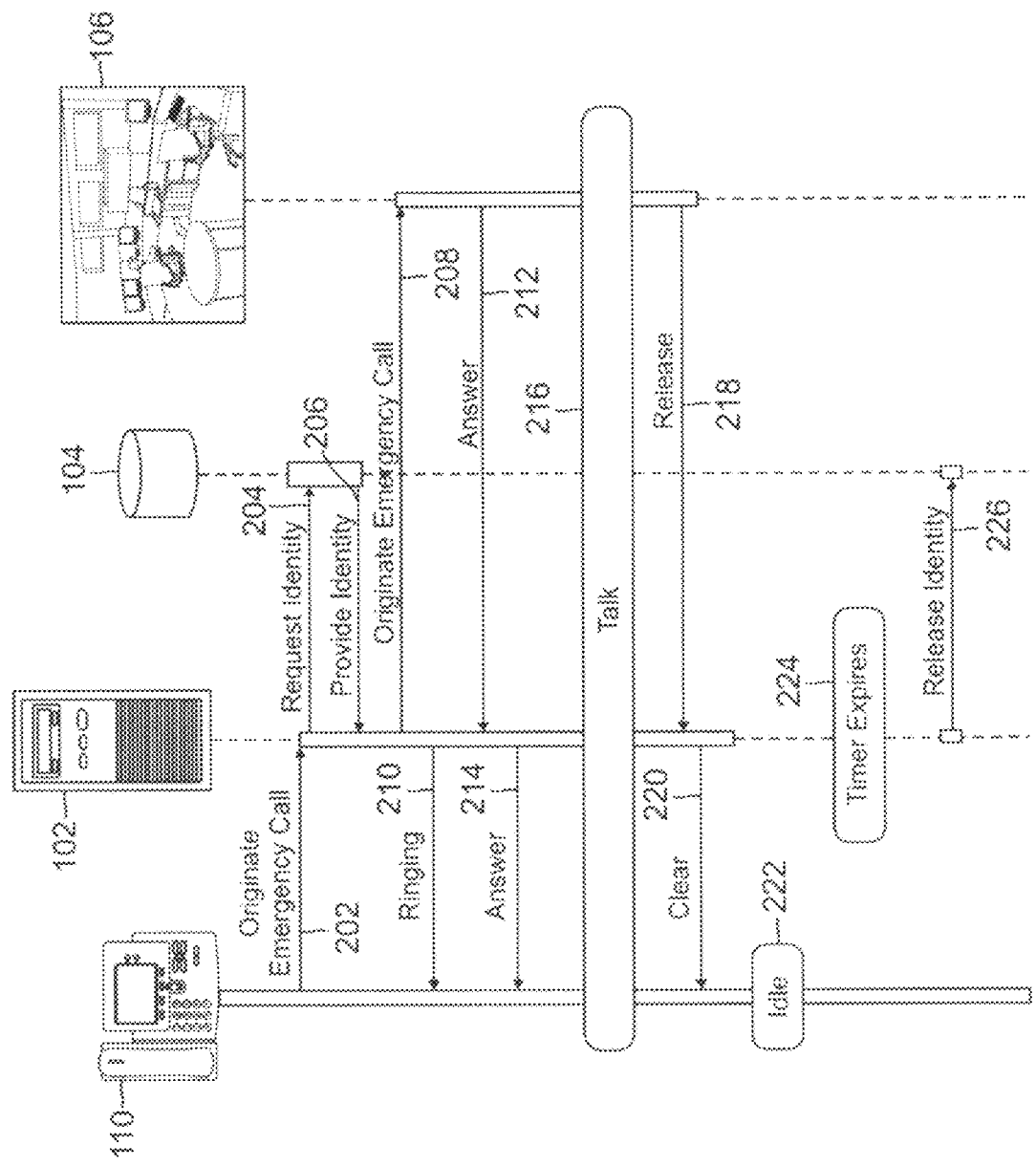
FIG. 2 is a diagram illustrating exemplary processes for allocating a callback identity for an emergency call until a timeout occurs in accordance with one or more aspects of the present disclosure.

Referring now to FIG. 2, a diagram illustrating exemplary processes for allocating a callback identity for an emergency call until a timeout occurs in accordance with one or more aspects of the present disclosure is shown. A user operating their device 110 can originate an emergency call at 202. When dialing, the user can connect their device 110 to the PBX 102. A request for a callback identity can be made by the PBX 102 to the pool of callback identities 104 at 204. At 206, a callback identity can be returned to the PBX 102. The callback identity can insure that a proper connection between the device 110 and the answering point 106 can be maintained. Before a callback identity is provided, the PBX 102 can determine whether there is a service identification for the device 110. The service identification can be used instead of assigning a callback identity when available.

At 208, the emergency call can be provided to the answering point 106. During this time, the PBX 102 can provide a ringing tone to the device 110 at 210. To connect the call, an operator at the answering point 106 can provide an answer to the emergency call originated by the device 110 at 212. The answer can go through the PBX 102 to the user device 110 at 214.

When successfully connected, the user of their device 110 and the operator within the answering point 106 can talk to handle the emergency at 216. When the conversation ends, the answering point 106 can send a release command to the PBX 102 at 218. This can clear the user device 110 at 220. This release signal can cause the PBX 102 to release the callback identity of the user device 110. Alternatively, and as shown in FIG. 2, the device 110 can sit idle at 222. When the timer expires for the callback identity at 224, the PBX 102 can release the callback identity back to the pool of callback identities 104 at 226.

Figure 3:
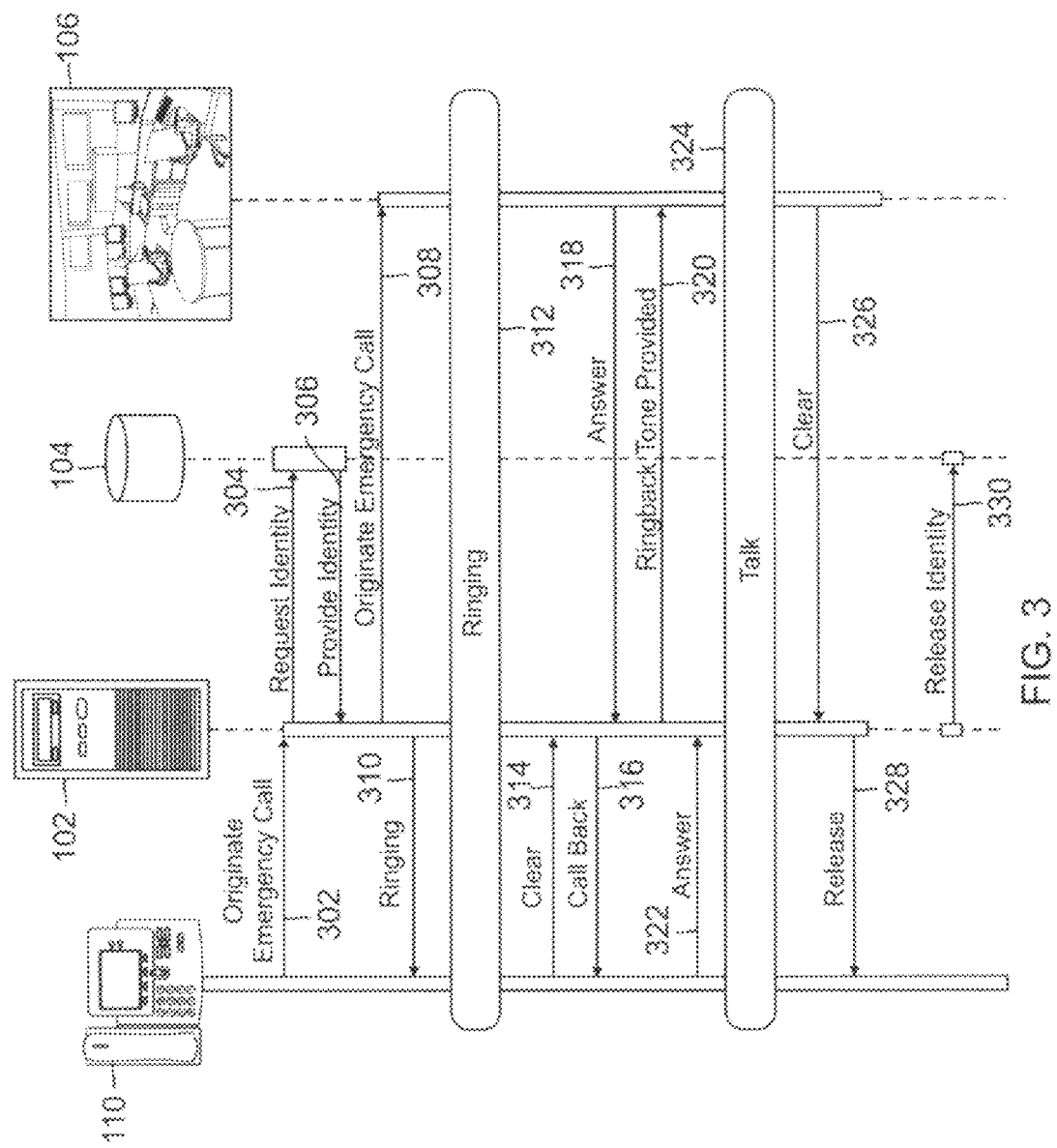
FIG. 3 is a diagram illustrating exemplary processes for handling an emergency call when the call becomes abandoned before being established in accordance with one or more aspects of the present disclosure.

Referring to FIG. 3, a diagram illustrating exemplary processes for handling an emergency call when the call becomes abandoned before being established in accordance with one or more aspects of the present disclosure is shown. At 302, a user of their device 110 can originate an emergency call. The call can be provided to the PBX 102 from the user device 110. A request for a callback identity can be made by the PBX 102 to the pool of callback identities 104 at 304. At 306, a callback identity can be returned to the PBX 102. Before a callback identity is provided, the PBX 102 can determine whether there is service identification for the device 110. The service identification can be used instead of assigning a callback identity when available.

At 308, the emergency call can be provided to the answering point 106. At 310, the PBX 102 can ring the user device 110 to establish a connection between the user device 110 and the answering point 106. At 312, the device 110 can continue to ring. In the illustration provided in FIG. 3, the user of the device 110 can clear the call or abandon it before the call is established at 314.

The PBX 102 can attempt to call back the user device 110 at 316. The answering point 106 can provide an answer to the emergency call at 318. At 320, a ringback tone can be sent to the answering point 106. The user can answer the call provided by the PBX 102 at 322. A connection between the device 110 and the answering point 106 can be re-established using the callback identity. At 324, each of the parties can talk with one another to handle the emergency. The answering point 106 can provide a clear instruction to the PBX 102 at 326. The PBX 102 can release the user device 110 at 328. At 330, the callback identity can be released back to the pool of callback identities 104.

Referring now to FIG. 4, a diagram illustrating exemplary processes for handling an emergency call when the call becomes abandoned after being established in accordance with one or more aspects of the present disclosure is shown. At 402, a user of their device 110 can originate an emergency call. The call can be provided to the PBX 102 from the user device 110. A request for a callback identity can be made by the PBX 102 to the pool of callback identities 104 at 404. At 406, a callback identity can be returned to the PBX 102 from the pool of callback identities 104. Before a callback identity is provided, the PBX 102 can determine whether there is a service identification for the device 110. The service identification can be used instead of assigning a callback identity when available.

At 408, the emergency call can be provided to the answering point 106. The PBX 102 can provide a ringing tone to the device 110 at 410. To connect the call, an operator at the answering point 106 can provide an answer to the emergency call originated by the device 110 at 412. An answer by the user device 110 can go through the PBX 102 to complete the connection at 414.

Through the established connection, the user and operator can talk with each other to handle the emergency at 416. At 418, however, a ringback tone is provided from the PBX 102 to the answering point 106 indicating that the user has abandoned their call or it has become disconnected. The PBX 102 can receive a clear instruction from the user device 110 at 420. At 422, the PBX 102 can call back the user device 110 to re-establish the connection through the callback identity.

At 424, the user device 110 can be rung. At 426, an answer can be provided from the user device 110 to the PBX 102. The user and the answering point 106 can then talk through the re-established connection at 428. The answering point 106 can clear the connection when the emergency call has been properly handled at 430. The PBX 102 can release the user device at 432. At 434, the callback identity can be released back to the pool of callback identities 104.

Those skilled in the relevant art will appreciate that combinations of those processes described above can be integrated into one another. Furthermore, fewer or more processes can also be implemented within FIGS. 2 through 4. For example, calls that have been idle for a period of time can be dropped in favor of new emergency calls when the number of callback identities distributed by a PBX 102 are limited. Priorities for callback identities can also be set within the PBX 102. For example, a higher priority can be set when "911" is dialed from a user device 110 into the PBX 102 and a lower priority can be set for a dialed in local security number. Based on these priorities, the lower priority calls can be dropped when not enough callback identities can be assigned.

The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein can be implemented as logical operations and/or modules. The logical operations can be implemented as a sequence of processor-implemented executed steps and as interconnected machine or circuit modules. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for managing emergency calls through a private branch exchange (PBX) comprising:
   receiving an emergency call from a device at said PBX;
   determining, at said PBX, whether said device is registered with a service identification associated to said device;
   if said device is unregistered, assigning a callback identity to said device;
   establishing said emergency call from said device to an answering point; and
   releasing said callback identity;
   wherein said emergency call is established through said service identification if said device is registered with said service identification.

2. The method for managing emergency calls of claim 1, wherein establishing said emergency call from said device to said answering point comprises providing a ring tone to said device, receiving an answer from said answering point and providing said answer to said device.

3. The method for managing emergency calls of claim 1, comprising re-establishing said emergency call through said callback identity when said emergency call has been disconnected before being established.

4. The method for managing emergency call of claim 1, comprising re-establishing said emergency call through said callback identity when said emergency call has been disconnected after being established.

5. The method for managing emergency calls of claim 1, comprising re-establishing said emergency call when said emergency call has been disconnected by ringing said device until said emergency call is answered or cleared by a system administrator.

6. The method for managing emergency calls of claim 1, wherein releasing said callback identity comprises receiving an instruction by a system administrator to clear said callback identity.

7. The method for managing emergency calls of claim 1, wherein releasing said callback identity comprises defining a time limit for said callback identity and clearing said callback identity when said time limit expires.

8. The method for managing emergency calls of claim 1, comprising receiving a request for a new callback identity from said device and re-providing said callback identity assigned to said device.

9. An emergency callback system comprising:
   a private branch exchange (PBX) having at least one callback identity to temporarily assign to a device that is unregistered with said PBX for re-establishing a call to an answering point when said call becomes abandoned, said at least one callback identity released when cleared by said answering point.

10. The emergency callback system of claim 9, wherein said answering point is at least one of an emergency response notification system, public safety answering point and emergency call alarm display.

11. The emergency callback system of claim 9, wherein said at least one callback identity is independent of location.

12. The emergency callback system of claim 9, wherein said answering point continues to reconnect with said device until cleared.

13. The emergency callback system of claim 9, wherein said call becomes abandoned before a conversation or during said conversation.

* * * * *